(12) United States Patent
Bourde et al.

(10) Patent No.: US 11,656,331 B2
(45) Date of Patent: May 23, 2023

(54) SYSTEM AND METHOD OF EMULATING ECHO SIGNALS FROM EMULATED TARGETS WITH REDUCED INTERFERENCE

(71) Applicant: Keysight Technologies, Inc., Santa Rosa, CA (US)

(72) Inventors: Christian Bourde, Santa Rosa, CA (US); Gregory Douglas Vanwiggeren, San Jose, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 317 days.

(21) Appl. No.: 17/148,230

(22) Filed: Jan. 13, 2021

(65) Prior Publication Data

US 2022/0171022 A1 Jun. 2, 2022

Related U.S. Application Data

(60) Provisional application No. 63/119,360, filed on Nov. 30, 2020.

(51) Int. Cl.
*G01S 7/40* (2006.01)
*G01S 13/34* (2006.01)
*H04B 17/391* (2015.01)
*H04B 17/11* (2015.01)

(52) U.S. Cl.
CPC ............ *G01S 7/4056* (2013.01); *G01S 13/34* (2013.01); *H04B 17/11* (2015.01); *H04B 17/391* (2015.01)

(58) Field of Classification Search
CPC ..... G01S 7/4056; G01S 13/34; H04B 17/391; H04B 17/11
See application file for complete search history.

(56) References Cited

U.S. PATENT DOCUMENTS

| | | | |
|---|---|---|---|
| 6,114,985 A | 9/2000 | Russell et al. | |
| 8,866,667 B2 | 10/2014 | Vacanti | |
| 10,613,198 B2 | 4/2020 | Vacanti | |
| 10,649,067 B1 | 5/2020 | Yang et al. | |

(Continued)

OTHER PUBLICATIONS

Werner Scheiblhofer et al., "A Low-Cost Multi-Target Simulator for FMCW Radar System Calibration and Testing", Proceedings of 47th Euro. Microwave Conference, 2017, pp. 1-4.

(Continued)

*Primary Examiner* — Timothy A Brainard
*Assistant Examiner* — Helena H Seraydaryan

(57) ABSTRACT

A system and method are provided for emulating echo signals using test equipment, including an antenna and an I/Q mixer, in response to a radar signal transmitted by a radar under test. The method includes receiving the radar signal from the radar under test, where a reflection component of the radar signal is reflected from at least the antenna; mixing the received radar signal as a local oscillator (LO) signal with I and Q signals at the I/Q mixer to output a mixing product as a radio frequency (RF) signal, where a leakage component of the LO signal leaks through the I/Q mixer; substantially canceling the reflection component of the radar signal using the leakage component of the LO signal; and transmitting the RF signal as the emulated echo signal to the radar under test, wherein the emulated echo signal indicates at least a range to the emulated target.

20 Claims, 6 Drawing Sheets

(56) References Cited

U.S. PATENT DOCUMENTS

2017/0168140 A1* 6/2017 Hosokawa ............ H04B 1/525
2019/0317186 A1 10/2019 Hayashi

OTHER PUBLICATIONS

Doug Jorgesen, "IQ, Image Reject & Single Sideband, Mixer Primer", Marki Microwave, Inc., 2018, www.markimicrowave.com, pp. 1-11.
David A. Hall, "Understanding the basics of image and carrier suppression measurements", Designlines Test & Measurement Designline, EEtimes, 2007, https://www.eetimes.com/understanding-the-basics-of-image-and-carrier-suppression-measurements/, pp. 1-12.
"Radar Target Simulator, Direct Reading, 79 GHz", STR-773-12-D1, SAGE Millimeter, Inc., 2018, Eravant, https://www.eravant.com/76-5-ghz-wr-12-dc-to-250-mhz-i-qfreq-30-db-carrier-rej-direct-reading-radar-target-simulator, pp. 1-2.

* cited by examiner

SYSTEM AND METHOD OF EMULATING ECHO SIGNALS FROM EMULATED TARGETS WITH REDUCED INTERFERENCE

CROSS-REFERENCE TO RELATED APPLICATION

The present application claims priority under 35 U.S.C. § 119(e) to U.S. Provisional Application No. 63/119,360 filed on Nov. 30, 2020. The entire disclosure of U.S. Provisional Application No. 63/119,360 is specifically incorporated herein by reference in its entirety.

BACKGROUND

Advanced driver-assistance systems (ADASs) and autonomous driving systems for vehicles rely on detection and ranging systems that use detection and ranging electromagnetic signals, including millimeter wave radar signals, for example. The radar signals are used to warn of forward collisions and backward collisions, to implement adaptive cruise control and autonomous parking, for example, and ultimately to perform autonomous driving on streets and highways. ADASs are promising due to low cost, and the ability to operate at night or in inclement weather conditions (e.g., fog, rain, snow, dust).

Conventional automotive radar systems typically have multiple transmitters and receivers on the vehicle. Actual driving environments in which the radar systems may be deployed can vary greatly, and many such driving environments may be complex. For example, actual driving environments may contain numerous objects, some of which may objects encountered in actual driving environments have complicated reflection, diffraction and multi-time reflection characteristics that affect echo signals responsive to the radar signals. The immediate consequences of incorrectly sensing and/or interpreting echo signals may be that false warnings or improper reactions are triggered or warnings or reactions that should be triggered are not, which in turn can lead to collisions.

Emulation of targets for radar testing is desirable, since operating a vehicular radar in the actual driving environment may be dangerous, inefficient, expensive, and difficult to control. For example, road testing may be problematic and expensive. Only a few locales worldwide have allowed so-called driverless road testing. Even then, these locales typically require a person as an emergency driver in the driver seat in case the ADAS were to make an error. Much of the early data, in particular, are questionable because the safety driver would actively manipulate the steering wheel.

Generally, conventional radar target emulators attempt to emulate the physics of the problem. For example, a conventional radar target emulator may receive a radar signal transmitted from a radar under test, delay the radar signal by an amount corresponding to propagation delay resulting from range to the emulated target, scaling amplitude of the radar signal to account for the range and radar cross section (RCS) of the target, and then retransmitting the scaled and delayed signal back to the radar under test, thereby emulating the transmission of the radar signal from the radar under test to the target and reflection of a corresponding echo signal.

Some conventional emulator systems use single-sideband (SSB) modulation and reflection (re-transmission) of a frequency shifted signal to test frequency modulated continuous wave (FMCW) radars, for example. Such emulator systems may includes a transmit-receive probe antenna connected to a microwave circulator, with an SSB mixer and a variable attenuator in the feedback path. The conventional emulator systems generate return signals (emulated echo signals) from the emulated radar targets, as well as unwanted signals what may be referred to as "ghost targets." The ghost targets result from extraneous radio frequency (RF) signals, such as harmonics or intermodulation products, local oscillator feedthrough, and/or reflections of the radar signals from the hardware of the emulator system, such as the probe antenna, a microwave circulator and/or other downstream components.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
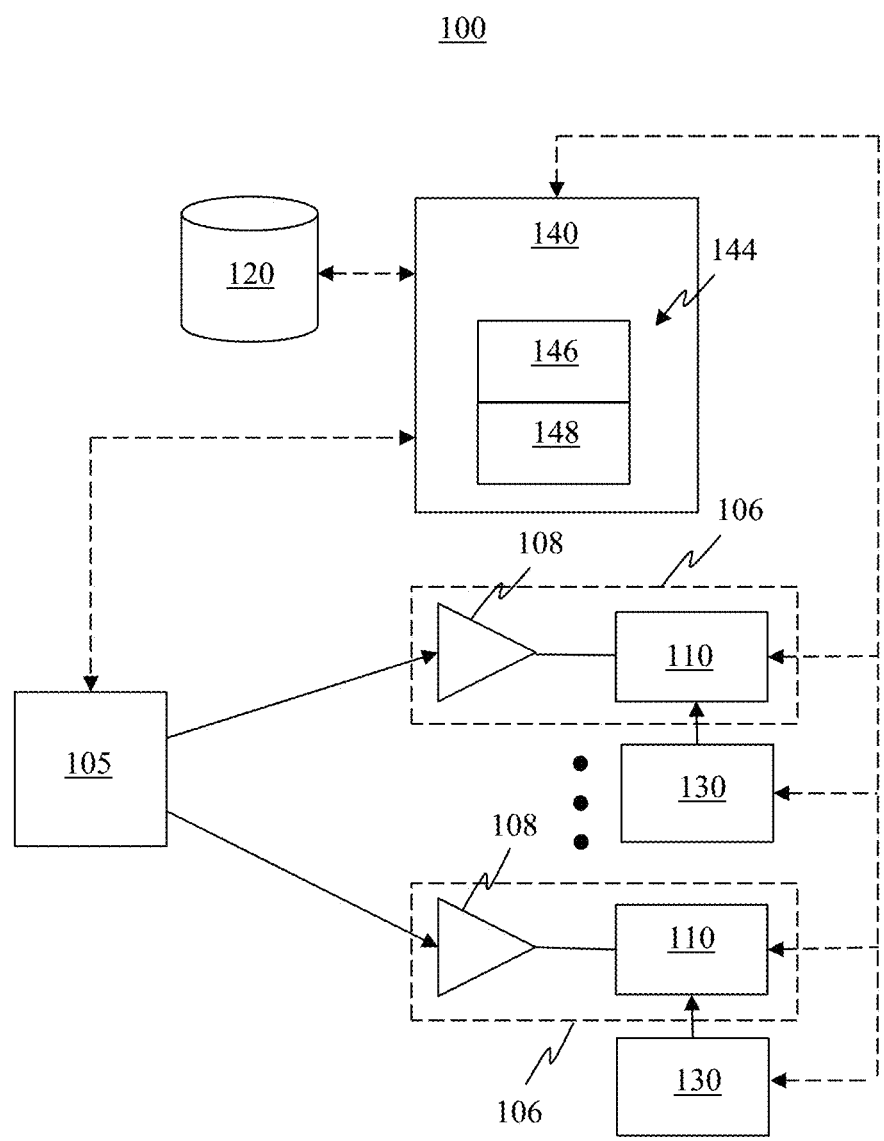
FIG. 1 is a simplified block diagram showing a system for emulating echo signals with reduced interference, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a drive emulation system is able to emulate echo signals from emulated targets responsive to radar signal transmissions from a radar under test, arranged on a vehicle under test, such as an automobile or other mobile platform. The embodiments minimize interference, such as ghost targets, observed at the radar under test, caused by harmonics and intermodulation products, reflection of the radar signal from the test hardware, and/or LO leakage (residual radar signal that passes through a mixer). Ghost targets from an array of radar reflection modification devices may likewise be minimized through calibration of the overall emulator system.

According to a representative embodiment, a system is provided for emulating an echo signal reflected from an emulated target in response to a radar signal transmitted by a radar under test. The system includes a probe antenna, a receiver, a signal generator and a transmitter. The probe antenna is configured to receive the radar signal over-the-air from the radar under test, where a reflection component of the radar signal is reflected from at least the probe antenna. The receiver includes an I/Q mixer configured to input the received radar signal as an LO signal, to mix the LO signal with I and Q signals, and to output an RF signal, where a leakage component of the LO signal leaks through the I/Q mixer. The signal generator is configured to generate the I and Q signals mixed with the LO signal at the I/Q mixer. The transmitter is configured to transmit the RF signal as the emulated echo signal to the radar under test, the emulated echo signal indicating at least a range to the emulated target. Magnitude and phase of the leakage component of the LO signal are set to an equal magnitude and opposite phase of the reflection component of the radar signal, substantially canceling the reflection component of the radar signal received by the radar under test.

According to another representative embodiment, a method is provided for emulating echo signals from an emulated target using test equipment, including an antenna and an I/Q mixer, in response to a radar signal transmitted by a radar under test. The method includes receiving the radar signal from the radar under test, where a reflection component of the radar signal is reflected from at least the antenna; mixing the received radar signal as an LO signal with I and Q signals at the I/Q mixer to output a mixing product as an RF signal, where a leakage component of the LO signal leaks through the I/Q mixer; substantially canceling the reflection component of the radar signal using the leakage component of the LO signal; and transmitting the RF signal as the emulated echo signal to the radar under test, where the emulated echo signal indicates at least a range to the emulated target.

According to another representative embodiment, a method is provided for calibrating multiple transceivers for emulating echo signals in response to a radar signal transmitted by a radar under test, where the transceivers include multiple antennas and mixers, respectively. The method includes receiving a calibration signal at the antennas, where a portion of the calibration signal is reflected from at least each of the antennas as a reflection component of the calibration signal; mixing the calibration signal as an LO signal with I and Q signals input to each of the I/Q mixers to output mixing products as RF signals, respectively, where a portion of the LO signal passes through each I/Q mixer as a corresponding leakage component of the LO signal; sequentially adjusting DC values of the I and Q signals input to the I/Q mixers to minimize the corresponding leakage components of the LO signals through the I/Q mixers, respectively; and simultaneously adjusting DC values of the I and Q signals input to the I/Q mixers to create a cancellation signal from the corresponding leakage components of the LO signals. The cancellation signal has an equal magnitude and opposite phase of an aggregate reflection component of the calibration signal in order to substantially cancel the aggregate reflection component of the LO signal.

FIG. 1 is a simplified block diagram showing a system for emulating echo signals for a radar under test with reduced interference (e.g., elimination of ghost targets), according to a representative embodiment. As will be appreciated by one of ordinary skill in the art having the benefit of the present disclosure, one likely vehicular radar is automobile radar used in various capacities in current and emerging automobile applications. Another emulation example is in-vehicle person detection systems, in which the radar is configured to detect the presence or absence of people/children/pets in potentially harmful situations, such as in a parked car with windows up on a hot, sunny day, for example. However, it is emphasized that the presently described echo signal emulation system is not limited to automobile radar systems, and can be applied to other types of vehicles that could employ a vehicular radar system, including trucks, busses, motorcycles, bicycles, motorized bicycles (e.g., scooters), and aircraft, for example.

Referring to FIG. 1, the echo signal emulation system 100 is arranged to test radar under test 105, which may be configured to transmit FMCW radar signals and to receive return signals, including emulated echo signals emulating reflections (echoes) of the radar signals from targets in a scene emulation. The echo signal emulation system 100 may also work with some phase modulated continuous wave (PMCW) systems, as well. The radar under test 105 has one or more radar transmitters and corresponding transmit antennas, as well as one or more radar receivers and corresponding receive antennas. All or part of the system 100 may be included in a test chamber, such as an anechoic test chamber.

The system 100 includes multiple re-illuminators 106, each of which includes at least one re-illumination antenna 108 and at least one frequency offset transceiver 110, which may be a modulated reflection device (MRD), for example. The re-illumination antenna 108 may be a horn antenna (probe antenna), for example. As discussed in more detail below, each transceiver 110 generally includes a receiver circuit, a transmitter circuit, an in-phase (I)-quadrature (Q) mixer (I/Q mixer), and a signal generator 130 for generating I and Q signals that are input to the I/Q mixer and mixed with a local oscillator (LO) signal. The signal generator 130 may be a direct digital synthesizer (DDS), or a field-programmable gate array (FPGA) and a digital-to-analog converter (DAC), for example. The I/Q mixer may be considered part of both the receiver and transmitter circuits. A received radar signal is input to the I/Q mixer as the LO signal, the I and Q signals from the signal generator are input to the I/Q mixer as intermediate frequency (IF) signals, and a mixing product of the LO and IF signals is output by the I/Q mixer as an RF signal. The RF signal is amplified/attenuated as needed, and transmitted by the transmitter circuit to the radar under test 105 via the re-illumination antenna 108 as the emulated echo signal. For FMCW radar signals, the frequency and magnitude of the RF signal indicates emulated ranges and RCSs of the emulated targets. For example, for an FMCW radar signal using a chirp signal, the lower the frequency difference between the RF frequency of the RF signal within the linear ramp of the chirp signal and the emulated echo signal, the closer the emulated target appears to be to the radar under test 105. Generally, distance information is extracted from the frequency difference and RCS information is provided by the magnitude of the emulated echo signal.

In an alternative configuration, the signal generators 130 may not be physically included in each of the re-illuminators 106, in which case one signal generator 130 may provide the I and Q signals for multiple transceivers 110, without departing from the scope of the present teachings. In this configuration, the signal generator 130 may be implemented using a single source capable of creating independent I and Q signal frequencies for each re-illuminator 106, such as the FPGA and the DAC, for example.

There may be one re-illuminator 106 for each emulated target in the scene emulation. Alternatively, one re-illuminator 106 may be used for multiple emulated targets, including one or more diffuse targets and/or one or more non-diffuse targets. In an embodiment, the re-illuminators 106 may be arranged in a 2-D array, where each re-illuminator 106 represents an element in the 2-D array. In this case, the elements having a spatial position that corresponds to an emulated target would generate an emulated echo signal corresponding to that target.

The system 100 also includes a computer 140 with a controller 144. The controller 144 described herein may include a combination of memory 146 that stores instructions and an illustrative processor 148 that executes the stored instructions in order to implement all or part of the processes described herein. A database 120 may store information to be used for target emulation, including various predetermined scenarios that have one or more targets. For example, the database 120 may store desired characteristics of a point target, such as the range from the radar under test 105, the RCS, velocity, acceleration, and the like. The database 120 may further store information regarding parameters of the particular radar under test 105, such as codes, power, fields of view, and the like. The radar under test 105 may be connected to the computer 140 by various types of wired and/or wireless network connections. The controller 144 is configured to control operations of frequency offset transceivers 110, as well as the signal generators 130 via control signals, indicated by dashed lines.

The controller 144 may be housed within or linked to a workstation such as a computer or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling application of various principles as described in the present disclosure. The structural configuration of the controller 144 may include, but is not limited to, processor(s), computer-usable/computer readable storage medium(s), an operating system, application module(s), peripheral device controller(s), slot(s) and port(s), as discussed below.

Additionally, although the computer 140 and/or the controller 144 show components networked together, multiple components may be integrated into a single system. For example, the computer 140 and/or the controller 144 may be integrated with a display (not shown) and/or with the system 100. On the other hand, the networked components of the computer 140 and/or the controller 144 may also be spatially distributed such as by being distributed in different rooms or different buildings, in which case the networked components may be connected via data connections. In still another embodiment, one or more of the components of the computer 140 and/or the controller 144 is not connected to the other components via a data connection, and instead is provided with input and/or output manually such as by a memory stick or other form of memory. In yet another embodiment, functionality described herein may be performed based on functionality of the elements of the computer 140 and/or the controller 144 but outside the system 100.

In the depicted embodiment, the computer 140 includes the controller 144, which includes memory 146, processor 148, as well as user and/or network interfaces (not shown) and a display (not shown). The computer 140 and/or the controller 144 may be implemented as a processing unit. In various embodiments, the processing unit may include one or more computer processors (e.g., processor 148), digital signal processors (DSPs), central processing units (CPUs), field-programmable gate arrays (FPGAs), application specific integrated circuits (ASICs), or combinations thereof, using any combination of hardware, software, firmware, hard-wired logic circuits, or combinations thereof. Each of the computer 140, the controller 144 and/or the processor 148 may include its own processing memory (e.g., memory 146) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIGS. 4 and 5. That is, execution of the instructions/computer readable code generally causes the processing unit of the computer 140 and/or the controller 144 to emulate echo signals reflected from emulated radar targets in response to the radar signals transmitted by the radar under test 105.

The memory 146, and any other memory described herein, including the database 120, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, Blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings. The memory 146 and the database 120 may be representative of one or more memories and databases, as well as multiple memories and databases, including distributed and networked memories and databases.

Generally, in operation, the radar under test 105 emits RF radar signals (illustratively mm wave signals) that are focused at a respective one of the re-illumination antennas 108, which are beneficially comparatively high-gain antennas, of one of the re-illuminators 106. The re-illumination antenna 108 may be a horn antenna (probe antenna) selected for the wavelength of signals received from the radar under test 105. The re-illumination antenna 108 may have a variable gain, and may be coupled to a beamshaping element, such as a lens to tailor a degree of freedom of an angle of arrival (AoA). Of course, other types of antennas, such as patch antennas or patch antennas arrays, may be incorporated as the re-illumination antenna 108, without departing from the scope of the present teachings.

In an embodiment, the system 100 may further include a diffractive optical element (DOE) for directing the radar signal to the re-illuminators 106, respectively, as described in U.S. patent application Ser. No. 16/867,804 to Gregory S. Lee, filed May 6, 2020, which is incorporated herein by reference in its entirety. The DOE is configured to focus the radar signals at the re-illumination antennas 108. In this embodiment, the emitted radar signals are incident on a first side of the DOE, which diffracts the signals from the radar under test to be focused at a respective one of the re-illumination antennas 108. As such, the DOE diffracts the incident wave at a particular angle relative to a second side of the DOE, and each diffracted wave is focused on a respective one of the re-illumination antennas 108. Of course, the system 100 may include other means of focusing the radar signals at respective ones of the re-illumination antennas 108, without departing from the scope of the present teachings. Notably, the respective focal points (alternatively foci) at each one of the re-illumination antennas 108 represents a target that is emulated by the system 100.

The radar signals incident on the re-illumination antennas 108 are provided to respective ones of the frequency offset transceivers 110. As described more fully herein, based on input from the controller 144, frequency shifting of the incident signals is effected in each of the frequency offset transceivers 110 and beneficially emulates a distance of a target from the radar under test 105, or a velocity of a target relative to the radar under test 105, or both. In addition, the azimuth (+x direction the coordinate system of FIG. 1) and the elevation (+z direction in the coordinate system of FIG. 1) are emulated by the re-illumination antennas 108. The re-illumination antennas 108 may be part of an electronically steerable antenna array of the re-illuminators 106. Alternatively, the re-illumination antennas 108 may be mechanically gimballed, may be mechanically moved, or may have a combination of mechanical gimballing/movement and electronic emulation. Likewise, the re-illuminators 106 may be mechanically moved, instead of or in addition to the re-illumination antennas 108. The re-illuminated signals provided by the frequency offset transceivers 110 are incident on the radar under test 105. The computer 140 receives the signals from the radar under test 105 for further analysis of the accuracy of the radar under test 105.

Generally, a radar utilizing FMCW waveforms operates by transmitting an RF radar signal in the 77 GHz band, for example. The radar signal is modulated such that the instantaneous frequency linearly changes from a first frequency to a second frequency over a predetermined time period, referred to as a chirp signal. The RF frequency may increase linearly (upchirp) over the predetermined time period, where the first frequency (e.g., 77 GHz) is less than the second frequency (e.g., 78 GHz), or the RF frequency may decrease linearly (downchirp) over the predetermined time period, where the first frequency (e.g., 78 GHz) is greater than the second frequency (e.g., 77 GHz). This linear ramp in frequencies is repeated to form a continuous wave signal that is transmitted from the radar.

The transmitted radar signal propagates at the speed of light towards a target, reflects from the target, and returns to the radar as a reflected echo signal, where the echo signal is delayed by the round trip time between the radar and the target. The length of this delay corresponds to a distance between the radar and the target. The echo signal is then mixed with a currently transmitted radar signal in the radar, an operation known as homodyne reception. A resulting IF signal has a frequency equal to the instantaneous difference between the frequency of the received echo signal and the frequency of the currently transmitted radar signal at the radar.

That is, owing to the delay in the received echo signal and the linear ramp in frequencies of the transmitted radar signal over the predetermined time period, there will be a frequency difference between the currently transmitted radar signal (which has linearly changed in frequency) and the received echo signal (which is at the frequency of the originally transmitted radar signal). This frequency difference is therefore proportional to the roundtrip delay multiplied by the frequency sweep rate in Hertz per second (Hz/s). For example, since close targets are delayed less than distant targets, the close emulated targets will result in a smaller frequency difference and thus a lower IF signal frequency than more distant emulated targets. When the emulated target is a point target, the resultant IF signal will be a single tone at a single frequency. When the emulated target comprises multiple targets, the resultant IF signal has multiple tones with frequencies corresponding to the instantaneous ranges to respective targets. In the general case considering N targets, the IF signal at the radar will comprise N tones, the frequency of each tone corresponding to the range to a corresponding target and the amplitude of each tone corresponding to the relative received strength of echo signal from that target. Notably, the received strength is a function of range to the target from the radar, as well as reflectivity of the target per the target's RCS. For a given target RCS, the strength is generally inversely proportional to the range according to the function $1/R^4$, where R is the distance between the radar and the target.

In this context, the representative embodiments of the present disclosure utilize frequency offsets provided by the frequency offset transceivers 110 to emulate ranges to emulated targets from the radar under test 105. Using frequency offset, each emulated target is indicated by an effective frequency shift due to the propagation delay. However, rather than delaying transmission of the echo signal to indicate the range, the delay itself is emulated by the frequency offset transceiver imparting the expected frequency shift corresponding to the desired delay to the echo signal. For example, as discussed in more detail below, the radar signal transmitted from the radar under test 105 may be mixed at the frequency offset transceiver 110 by a frequency offset signal using a single-sideband (SSB) mixer. This frequency offset signal has a frequency (or pattern of frequencies) equal to the required frequency shift that would be present in the echo signal that corresponds to the delay (or round trip difference). Indeed, the frequency offset signal is exactly of the form of the desired IF signal at the radar under test 105 upon receiving the echo signal and mixing it with the currently transmitted radar signal. Thus, a single emulated target at a first range would result in an IF signal at the radar under test 105 comprised of a single tone with a frequency representing the range to the single target. This can be produced using the SSB mixer in the frequency offset transceiver 110 by using the desired IF signal as the frequency offset signal. Multiple emulated targets would result in an IF signal comprised of multiple tones. Utilizing this multi-tone IF signal as the offset signal thus results in an echo signal that emulates the multiple emulated targets.

Figure 2:
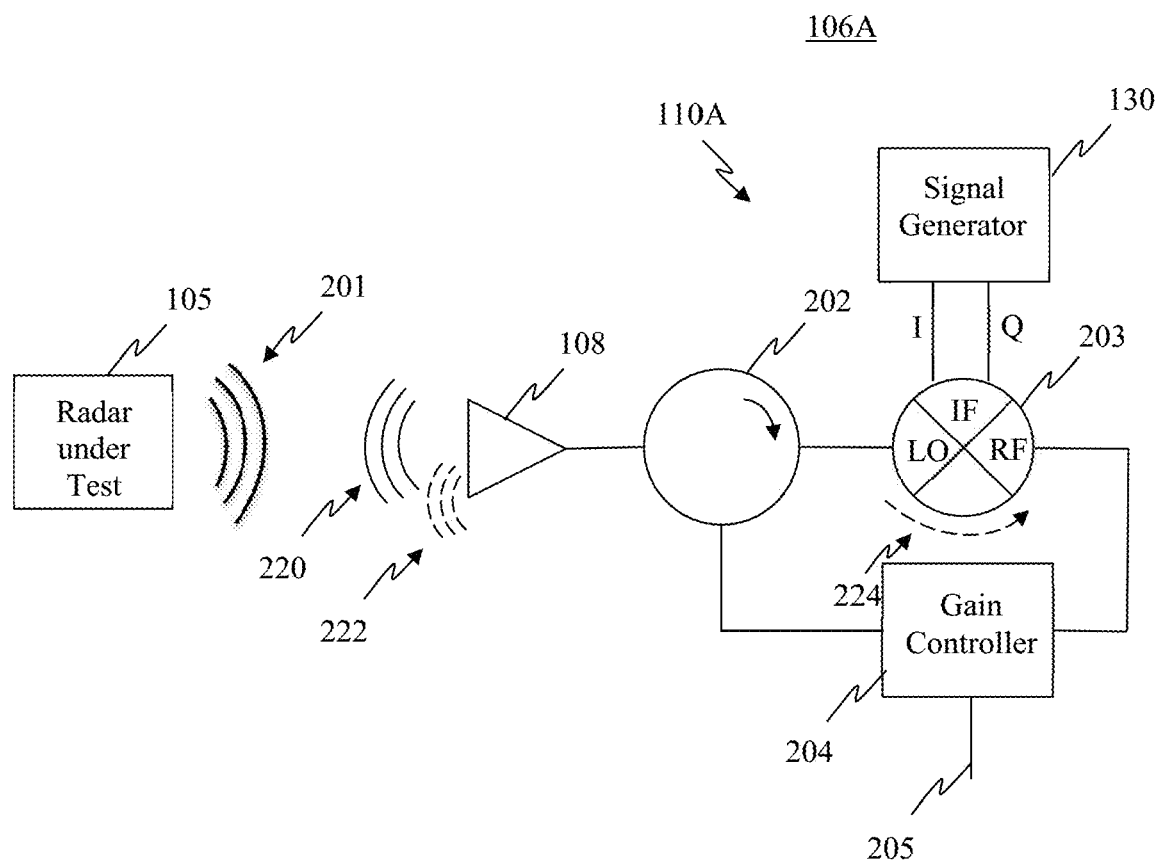
FIG. 2 is a simplified block diagram showing a re-illuminator device of the echo signal emulation system for emulating echo signals with reduced interference, according to a representative embodiment.

FIG. 2 is a simplified block diagram of a representative re-illuminator (and corresponding frequency offset transceiver) of FIG. 1, for emulating echo signals with reduced reflection and leakage components, according to a representative embodiment. Aspects of the re-illuminator described in connection with the representative embodiment may be common to all the re-illuminators.

Referring FIG. 2, re-illuminator 106A includes re-illumination antenna 108 and frequency offset transceiver 110A connected to the re-illumination antenna 108, as described above. Of course, in practice, there may be more than one frequency offset transceiver 110A in a system, and thus more than one re-illumination antenna 108 (e.g., as depicted in the representative embodiment of FIG. 1). The re-illumination antenna 108 is configured to receive a radar signal 201 over-the-air from the radar under test 105. The frequency offset transceiver 110A is configured to generate an emulated echo signal 220 in response to the radar signal indicating an emulated target, where the emulated echo signal 220 is transmitted by the re-illumination antenna 108 and received by the radar under test 105. The emulated echo signal 220 indicates range to the emulated target from the radar under test 105 based on the scene emulation, e.g., stored in the database 120. In addition, a reflection component 222 of the radar signal is reflected by the re-illumination antenna 108 and the frequency offset transceiver 110A, and a leakage component 224 of the radar signal leaks through the I/Q mixer 203. As used herein, the reflection component 222 includes a portion of the radar signal that is physically reflected from system hardware, such as the re-illumination antenna 108 and exterior structures of the frequency offset transceiver 110A, as well as reflections of electrical power, such as indicated by non-zero reflection coefficient ($S_{11}$), e.g., resulting from impedance mismatches at least between the re-illumination antenna 108 and the offset transceiver 110A. The reflection component 222 and the leakage component 224 may be received by the radar under test 105, thereby interfering with the emulated echo signal 220, unless the reflection component 222 and the leakage component 224 are reduced and/or minimized, according to aspects of the present disclosure, a discussed below.

In the depicted embodiment, the frequency offset transceiver 110A includes a circulator 202, the I/Q mixer 203 and the signal generator 130. The circulator 202 enables the frequency offset transceiver 110A to use a single re-illumination antenna 108 for receiving the radar signals 201 from the radar under test 105, and transmitting the emulated echo signals 220 to the radar under test 105. Alternatively, the re-illumination antenna 108 may be implemented as separate receive and transmit antennas, without departing from the scope of the present teachings, in which case the circulator 202 may be omitted.

The I/Q mixer 203 may be an SSB mixer, for example, with standard 90 degrees phasing of the radar signal, resulting in an output of either the upper sideband (USB) or the lower sideband (LSB), rejecting the LSB or USB, respectively. The signal generator 130 may be implemented using a direct digital synthesizer (DDS), or an FPGA and a digital-to-analog converter (DAC), for example, although other types of controllable signal generators may be incorporated without departing from the scope of the present teachings. The signal generator 130 is controllable, e.g., by the computer 140, to provide I and Q signals of various magnitudes and phases. The signal generator 130 is also controllable to separately adjust DC values (DC offsets) of the I and Q signals, as discussed below.

In the depicted embodiment, the I/Q mixer 203 includes an LO port, an RF port and an IF port, where the LO port is configured to receive the radar signal 201 from the re-illumination antenna 108 as the LO signal, and the IF port is configured to receive the I and Q signals from the signal generator 130. In the depicted embodiment, the radar signal 201 may be considered an LO signal and input to the LO port since it is being amplified and/or limited in order to drive the I/Q mixer 203 with a large signal. The I/Q mixer 203 mixes the radar signal with the I and Q signals, and outputs the mixing product as an RF signal from the RF port ultimately to be provided as the emulated echo signal 220, e.g., following amplification and/or attenuation. Although not shown, it is understood that the frequency offset transceiver 110A may further include signal processing components, e.g., filters, attenuators and/or amplifiers, for processing the radar signal 201 prior to the radar signal 201 being input to the I/Q mixer as the LO signal.

The signal generator 130 adjusts the magnitudes and phases of the I and Q signals input to the I/Q mixer 203 in order to adjust the magnitude and phase of the output RF signal. For example, the RF signal output by the I/Q mixer 203 may include a desired sideband (DSB) and an undesired sideband (USB), where the DSB is a frequency shifted version of the LO signal (radar signal 201) that is transmitted to the radar under test 105 as the emulated echo signal 220. In an embodiment, the signal generator 130 adjusts the magnitudes and phases of the I and Q signals to minimize the USB of the RF signal.

The signal generator 130 also adjusts the DC values of the I and Q signals in order to adjust magnitude and phase of the leakage component 224 of the LO signal. In the depicted embodiment, the magnitude and phase of the leakage component 224 are adjusted in order to substantially cancel the reflection component 222 of the radar signal 201. That is, the leakage component 224 is the portion of the LO signal (radar signal 201) that passes through the I/Q mixer 203 without mixing with the I and Q signals input from the signal generator 130. Since the leakage component 224 bypasses the mixing process, the leakage component 224 has the same RF frequency as the radar signal 201, and thus the same RF frequency as the reflection component 222.

Both the reflection component 222 and the leakage component 224 are undesirable signals, which will be sent to the radar under test 105 if not removed, causing interference. To prevent this, the magnitude and phase of the leakage component 224 are adjusted using the signal generator 130, such that the leakage component 224 has the same magnitude and opposite phase of the reflection component 222, thereby substantially canceling the reflection component 222 (as well as the leakage component 224 itself). "Substantially canceling" means reducing the power of the reflection component 222 and/or the leakage component 224 to a level indistinguishable from noise floor or "clutter." For example, the combined reflection and leakage components 222 and 224 may be measured on a spectrum analyzer, e.g., by sweeping the I channel DC offset until a null (or minimum) is observed, sweeping the Q channel DC offset while the I channel DC offset is set to the null value, and repeating until a desired level of cancelation is achieved. Removing the reflection component 222 and/or the leakage component 224 prevents the appearance of ghost targets.

The RF signal output from the I/Q mixer 203 may be provided to a gain controller 204, such as a variable gain amplifier (VGA) or an output attenuator, which comprises a control input 205. As alluded to above, the gain control input 205 of the gain controller 204 may be controlled by the computer 140. The gain controller 204 further enables proper emulation of the echo signal 220 responsive to the radar signal 201 from the radar under test 105 at the re-illumination antenna 108. Notably, the power of the emulated echo signal 220 from the re-illumination antenna 108 is an indication of the RCS of an emulated target. As such, the gain or attenuation provided by the gain controller 204 is selected at the control input 205 based on the power of the radar signal incident on the re-illumination antenna 108, and the RCS at the desired emulation distance of the emulated target.

Figure 3:
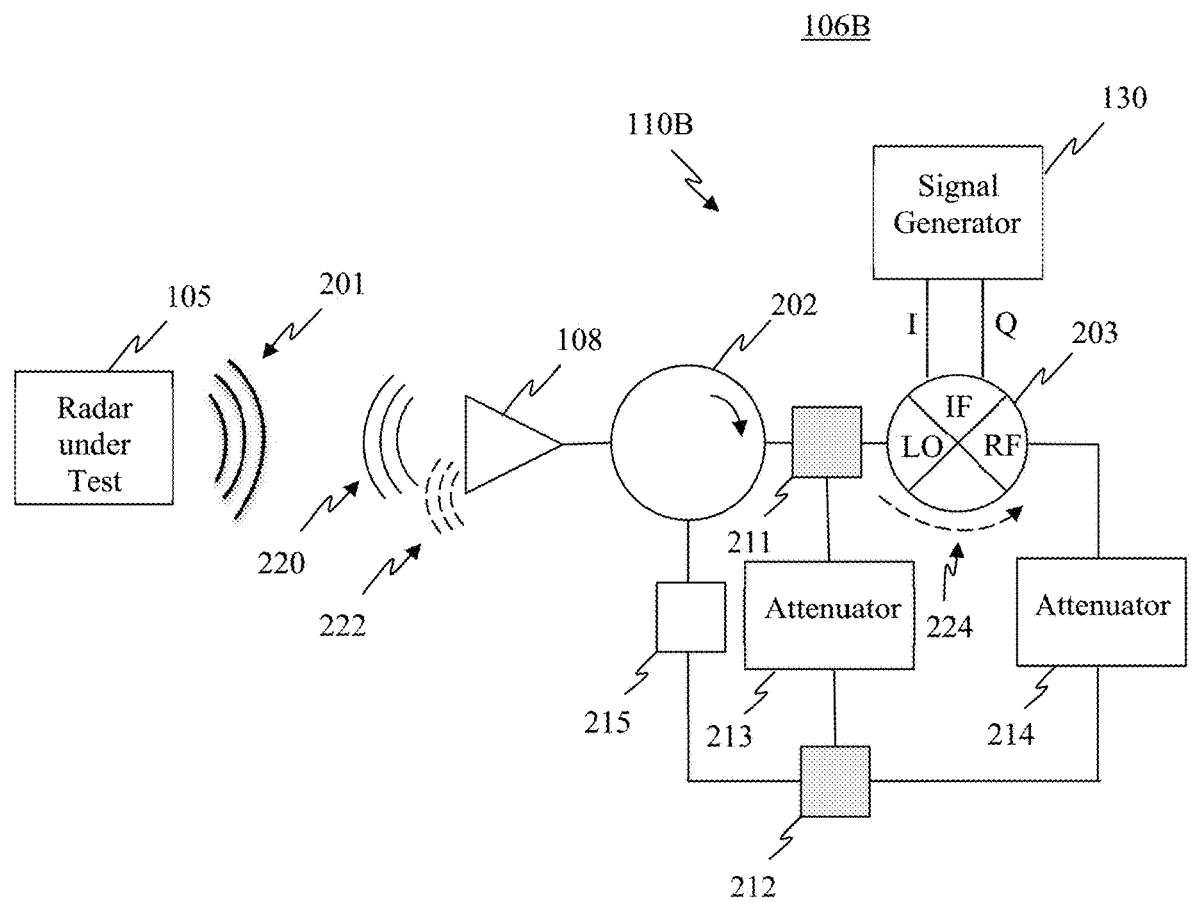
FIG. 3 is a simplified block diagram showing a re-illuminator of the echo signal emulation system for emulating echo signals with reduced interference, according to another representative embodiment.

FIG. 3 is a simplified block diagram of a another representative re-illuminator (and corresponding frequency offset transceiver) of FIG. 1, for emulating echo signals with reduced reflection and leakage components, according to a representative embodiment. Aspects of the re-illuminator described in connection with the representative embodiment may be common to all the re-illuminators described above.

Referring FIG. 3, re-illuminator 106B includes re-illumination antenna 108 and frequency offset transceiver 110B connected to the re-illumination antenna 108, as described above. The re-illumination antenna 108 is configured to receive a radar signal 201 over-the-air from the radar under test 105. The frequency offset transceiver 110B is configured to generate an emulated echo signal 220 in response to the radar signal indicating an emulated target, where the emulated echo signal 220 is transmitted by the re-illumination antenna 108 and received by the radar under test 105. In addition, the reflection component 222 is reflected from test hardware, and the leakage component 224 leaks through the I/Q mixer 203, where the reflection component 222 and the leakage component 224 may interfere with the emulated echo signal 220.

In the depicted embodiment, the frequency offset transceiver 110B includes the circulator 202, the I/Q mixer 203 and the signal generator 130. The I/Q mixer 203 includes the LO port, the RF port and the IF port, where the LO port receives the radar signal 201 from the re-illumination antenna 108 as the LO signal, the IF port receives the I and Q signals from the signal generator 130 for mixing with the LO signal, and the RF port outputs the mixing product as the RF signal to be used as the emulated echo signal 220. The signal generator 130 is configured to generate the I and Q signals, and to adjust the magnitudes and phases of the I and Q signals, e.g., under control of the computer 140, in order to adjust the magnitude and phase of the output RF signal. In the depicted embodiment, the signal generator 130 does not adjust the DC values of the I and Q signals, since the magnitude and phase of the leakage component 224 of the LO signal are adjusted using an attenuator circuit, discussed below, in order to substantially cancel the reflection component 222.

In particular, the frequency offset transceiver 110B further includes an RF splitter 211, an RF combiner 212, a first attenuator 213, a second attenuator 214, and a phase shifter 215. The RF splitter 211 receives the radar signal 201 from the re-illumination antenna 108 via the circulator 202, and splits the radar signal 201 to provide a split component of the radar signal 201. The remainder of the radar signal 201 is input to the I/Q mixer 203 as the LO signal, and is mixed with the I and Q signals to provide the RF signal. The output of the I/Q mixer 203 includes the RF signal and the leakage component 224 at the same RF frequency as the radar signal 201. The split component of the radar signal 201 is input to the first attenuator 213 to provide a first attenuated signal, and the output of the I/Q mixer 203 is input to the second attenuator 214 to provide a second attenuated signal, where the first and second attenuated signals are attenuated at the RF frequency of the radar signal. The first and second attenuated signals are combined by the RF combiner 212 to provide a combined signal that incudes the emulated echo signal 220 and the leakage component 224, and the combined signal is phase shifted by the phase shifter 215.

The attenuation by the first and second attenuators 213 and 214 is controlled, e.g., by the computer 140, such that the leakage component 224 in the combined signal has the same magnitude as the reflection component 222. The phase shifting by the phase shifter 215 is controlled, e.g., by the computer 140, such that the leakage component 224 has an opposite phase from the reflection component 222. The leakage component 224 therefore substantially cancels the reflection component 222. Although not shown, the frequency offset transceiver 110B depicted in FIG. 3 may also include a VGA and a gain control input as described above, without departing from the scope of the present teachings. Also, although the phase shifter 215 is shown located after the RF combiner 212, it is understood that the phase shifter 215 may be placed before to the RF combiner 212 in either or both of the signal paths including the first and second attenuators 213 and 214, respectively, without departing from the scope of the present teachings.

Generally, control of the re-transmitted power is used to emulate a consistent RCS. The RCS may be stored in look-up in tables in the database 120, for example. To this end, for a given range R to an emulated target, it is known that magnitude (strength) of the return echo signal is proportional to RCS and falls as $1/R^4$. A vehicle is typically quoted as being 10 dBsm, which is measuring area, meaning 10 dB relative to a square meter (s.m.), or in plain English, 10 square meters. Many objects have been tabulated (vehicles, pedestrians, bicycles, buildings, etc.), and those that have not may be calculated by ray tracing techniques. By the present teachings, emphasis is placed on providing a return echo signal strength to the radar under test 105 that is commensurate with the distance R (obeying the well-known $1/R^4$ radar decay law) and the accepted value of RCS for the particular object. In accordance with a representative embodiment, the signal strength (and thus power) is adjusted by adjusting the strength of the I and Q signals, with a weaker I and Q signals providing comparatively weaker emulated echo signals. Notably, in certain representative embodiments, the computer 140 precomputes the consistent return echo signal provided to the single point of focus at the radar under test 105, and the controller 144 then adjusts the strength of the I and Q signals to achieve this SSB strength. Alternatively, and beneficially, the gain or attenuation of gain controller 204 may be adjusted to control SSB strength of the return echo signal.

When the radar under test 105 is an FMCW device, the distance/velocity is emulated electronically using the frequency offset transceiver 110. To this end, FMCW radar systems use chirped waveforms, as discussed above, whereby the correlation of the original transmit (Tx) waveform from the radar under test 105 with the received (Rx) echo waveform reveals the target distance. For example, in upchirp/downchirp systems with chirp rates of $\pm k_{sw}$ (measured in Hz/s), a target at a distance d and zero relative velocity to the ego vehicle with the radar under test 105 will result in a frequency shift ($\delta f$) given by Equation (1), where c is the speed of light and the factor of 2 is due to the roundtrip propagation of the signal from the radar under test 105:

$$\delta f = \pm (2k_{sw} d/c) \qquad \text{Equation (1)}$$

The sign of the shift depends on which part of the waveform, upchirp vs. downchirp, is being processed. In contrast, Doppler shifts due to relative velocity manifest as "common mode" frequency shifts, e.g., a net upshift over both halves of the waveform indicates the radar under test is approaching closer to the target. Correlation is performed in the radar under test's IF/baseband processor; bandwidths of a few MHz are typical.

A commonly deployed variation of FMCW radar systems uses repetitive upchirps, or repetitive downchirps, but not both (with intervening dead times). As such, the distance to an emulated target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz to few tens of kHz.

Upon amplification/attenuation at the circulator 202, the frequency offset transceiver 110A, 110B provides an amplified/attenuated SSB signal that is retransmitted from the re-illumination antenna 108 to the radar under test 105.

Notably, decreasing the strength of the modulation I and Q drive signals will decrease the output tone strength and thus decrease the RCS. In practice, this method may not achieve more than 15-20 dB of dynamic range by modulation drive alone. However, the gain controller 204 makes up the deficit to achieve the desired RCS dynamic range, and 10-50 dB of variable gain can be readily achieved by a combination of variable attenuators and amplifier bias adjustment.

Figure 4:
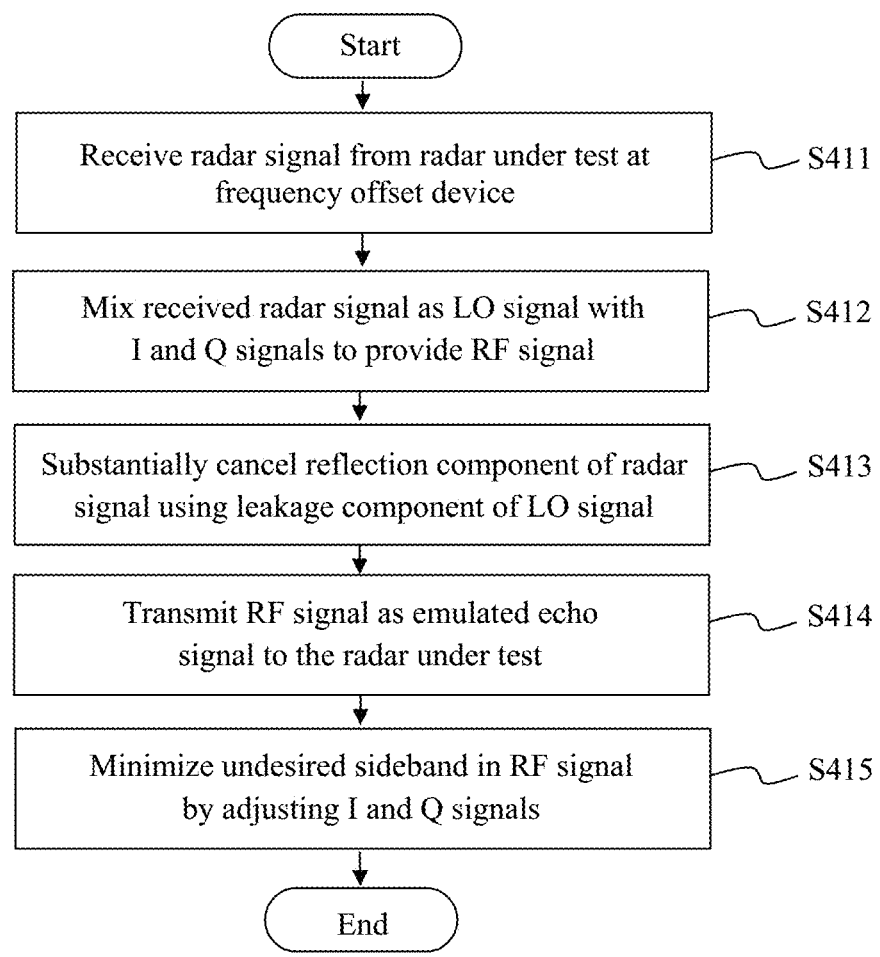
FIG. 4 is a simplified flow diagram showing a method for emulating echo signals with reduced interference, according to a representative embodiment.

FIG. 4 is a simplified flow diagram illustrating a method for emulating echo signals from targets with reduced reflection and leakage components using an echo signal emulation system, according to a representative embodiment. The method may be implemented by the system 100, discussed above, under control of the computer 140, for example.

Referring to FIG. 4, a radar signal is received from a radar under test at a frequency offset device (e.g., frequency offset transceiver 110) through a probe antenna (e.g., re-illumination antenna 108) in block S411. The radar signal may be an FMCW radar signal, for example. A portion of the radar signal (reflection component) is reflected from the test equipment, including the probe antenna and the frequency offset device used for emulating the echo signals. As stated above, the reflection component may include physically reflections from system hardware, as well as reflected power, e.g., as indicated by reflection coefficient ($S_{11}$). Without correction, the reflection component may be received by the radar under test as interference, e.g., indicating ghost targets.

In block S412, the received radar signal is mixed as an LO signal with I and Q signals at an I/Q mixer (e.g., I/Q mixer 203), which outputs the mixing product as an RF signal. It is understood that the received radar signal may be processed, e.g., filtered, attenuated and/or amplified, prior to being input to the I/Q mixer as the LO signal. A portion of the LO signal (leakage component) leaks through the I/Q mixer without being mixed with the I and Q signals. Without correction, the leakage component may also be received by the radar under test as interference, e.g., indicating ghost targets.

In block S413, the reflection component of the radar signal (LO signal) is substantially canceled using the leakage component of the LO signal. For example, DC values of the I and Q signals input to the I/Q mixer may be adjusted to set magnitude and phase of the leakage component of the LO signal to an equal magnitude and opposite phase of the reflection component of the radar signal. Alternatively, the radar signal may be split using an RF splitter, prior to mixing the LO signal with the I and Q signals at the I/Q mixer, to provide a split component of the radar signal, and the split component of the radar signal may be attenuated. The remainder of the radar signal is mixed as the LO signal at the I/Q mixer as described in block S412, and the leakage component of the LO signal is attenuated as well. The attenuated split component of the radar signal and the attenuated leakage component of the LO signal are combined using an RF combiner to provide a combined leakage component of the LO signal. At least one of the attenuated split component of the radar signal, the attenuated leakage component of the LO signal, or the combined leakage component of the LO signal is phase shifted using a phase shifter, so that the combined leakage component of the LO signal has the same magnitude and opposite phase as the reflection component of the radar signal.

In block S414, the RF signal is amplified/attenuated as needed to accurately represent an emulated target, and transmitted as the emulated echo signal to the radar under test. The radar under test receives the emulated echo signal without interference otherwise caused by the reflection component of the radar signal and/or the leakage component of the LO signal. As discussed above, the radar under test includes at least one homodyne receiver that mixes the received emulated echo signal with the radar signal currently transmitted from the radar under test to provide a corresponding radar IF signal. The radar IF signal has a frequency indicating a distance to the emulated target, and an amplitude indicating an RCS of the emulated target.

In block S415, a USB in the RF signal, transmitted as the emulated echo signal to the radar under test, may be minimized (optionally) by adjusting magnitude and phase of the I and Q signals input to the I/Q mixer. That is, the RF signal includes a DSB, which is the frequency shifted version of the LO signal, where the amount of frequency shift corresponds to a range of the emulated target from the radar under test. The RF signal also includes the USB, which typically occurs at a harmonic of the DSB.

The method described with reference to FIG. 4 is most effective over a narrow range of frequencies of the radar signal. Generally, as the frequency of the radar signal (and thus of the LO signal) drifts from the calibrated frequency, the frequency is tracked and the phase, amplitude and DC levels of the I and Q signals are adjusted to maintain cancelation of the reflection component of the radar signal, as discussed above, or the cancelation will not be optimum. This is sufficient particularly when the leakage component of the LO signal is minimized in the middle of the frequency range covered by the radar signal. In the alternative, the solution that includes splitting the radar signal, attenuating the split component and the output RF signal, and combining the split component and the RF signal, may provide broader applicability.

To get around calibrating individual emulated targets, particular where there are several such targets emulated my multiple frequency offset transceivers, and still canceling out reflection components, a group calibration may be performed in situ in the same echo signal emulation system in a test chamber. Generally, the frequency offset transceivers are driven at different IF frequencies while the test chamber is flooded with an mmwave signal from a source probe antenna, e.g., provided by a signal generator or a vector network analyzer (VNA), for example. That is, each frequency offset transceiver would output from its I/Q mixer an RF signal having a different frequency than the RF signals from the other frequency offset transceivers, thereby creating different DSB, USB and harmonic signals. Meanwhile, the LO signal (the mmwave signal from the source probe antenna) is the same for each, enabling the leakage component of the LO signal through each I/Q mixer to be adjusted in concert.

Figure 5:
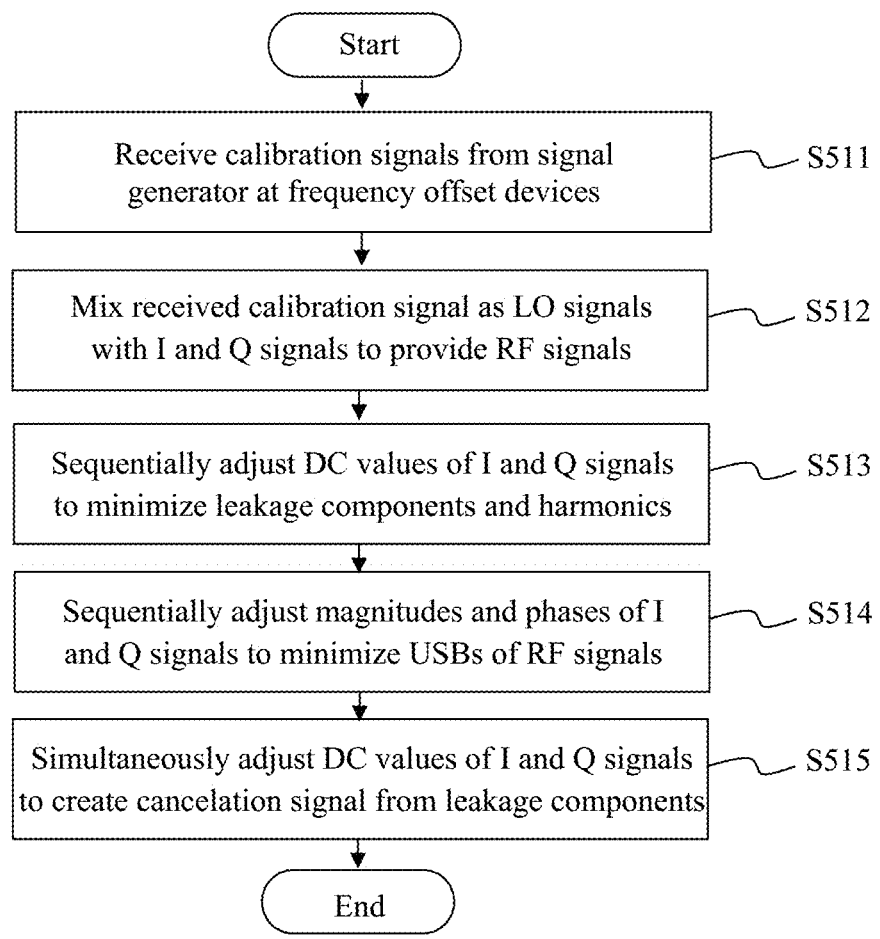
FIG. 5 is a simplified flow diagram showing a method for calibrating a system for emulating echo signals with reduced interference, according to a representative embodiment.

FIG. 5 is a simplified flow diagram showing a method for calibrating a system for emulating echo signals with reduced interference, according to a representative embodiment. The method may be implemented by the system 100, discussed above, under control of the computer 140, for example, where the system 100 includes multiple re-illuminators 106, each of which includes at least one re-illumination antenna 108 and at least one frequency offset transceiver 110.

Referring to FIG. 5, a calibration signal having a mmwave frequency of a radar signal is received from a signal generator at multiple frequency offset transceivers (frequency offset transceivers 110) through corresponding probe antennas (e.g., re-illumination antennas 108) in block S511. The calibration signal may be flooded into the test chamber through a source probe antenna connected to the signal generator. A portion of the calibration signal is reflected from each of the re-illuminators, e.g., at least the antenna, as a reflection component of the calibration signal corresponding to that re-illuminator.

In block S512, the calibration signal is mixed as LO signals with I and Q signals input to the I/Q mixers to output mixing products as RF signals, respectively. Due to differences in the I and Q signals for the different frequency offset transceivers, the RF signals include different frequencies, different DSBs, different USBs and different harmonics, respectively. A portion of the LO signal that passes through each of the I/Q mixers is a corresponding leakage component of the LO signal for that I/Q mixer. The LO signal may have an LO frequency in the middle of the chirp frequency range of an FMCW radar signal. For example, the LO frequency may be 76.5 GHz for an FMCW radar signal that chirps between 76.0 GHz and 77.0 GHz. However, other LO frequencies may be selected without departing from the scope of the present teachings.

DC values of the I and Q signals input to the I/Q mixers are sequentially adjusted in block S513 to minimize the corresponding leakage components of the LO signals through the I/Q mixers, respectively, and to minimize the harmonics of the RF signals, such as the upper harmonics, that track with the corresponding leakage components of the LO signals. That is, the DC values may be adjusted for the I/Q mixers individually, or one at a time. For example, the leakage component of the LO signal and the harmonics of the RF signal may be monitored using a VNA or spectrum analyzer while adjusting the DC values of the I and Q signals, until the respective minimums are obtained. In an embodiment, when the DC values of an I/Q mixer in one frequency offset transceiver are being adjusted, all of the other frequency offset transceivers are turned off. The DC values of the I and Q signals for the group of frequency offset transceivers are then set accordingly. Initially minimizing the leakage components of the LO signals is particularly useful when the leakage components dominate the outputs of the I/Q mixers.

In block S514, the magnitudes and phases of the I and Q signals input to the I/Q mixers are sequentially adjusted to minimize the USBs of the respective RF signals output by the I/Q mixers, respectively. That is, the magnitudes and phases may be adjusted for the I/Q mixers individually, or one at a time. For example, the USB of the RF signal may be monitored using the VNA or spectrum analyzer while adjusting the magnitudes and phases of the I and Q signals, until the respective minimum USB is obtained. The magnitudes and phases of the I and Q signals are then set accordingly.

In block S515, the DC values of the I and Q signals input to the multiple I/Q mixers are adjusted simultaneously to create a cancellation signal from the corresponding leakage components of the LO signals from the I/Q mixers in all of the frequency offset transceivers. That is, since the re-illuminators and corresponding re-illumination antennas and frequency offset transceivers are located at substantially the same range from a radar under test or the source probe antenna, they will collectively provide a large reflection signal, referred to as an aggregate reflection component of the calibration signal. In order to substantially cancel the aggregate reflection component, the cancellation signal is created to have equal magnitude and opposite phase of the aggregate reflection component.

Once the DC values of the I and Q signals input to the multiple I/Q mixers have been set, along with the magnitude and phase values of the I and Q signals previously set in block S514, the echo signal emulation system may be used for testing a radar under test. The testing may be performed, for example, in accordance with the method depicted in FIG. 4, although adjustments to I and Q input levels in block S413 may not be necessary due to the calibration steps in FIG. 5. That is, the only changes to the I and Q signals during the testing may be to frequencies for emulating different range and/or velocity values of the emulated target. Varying the I and Q amplitudes to change the RCS of the emulated target may be done using output VGAs/attenuators, since varying the I and Q input levels may require new calibration coefficients, depending on the characteristics of the I/Q mixer.

The calibration described above works particularly well when performed at each frequency of interest for possible radar signals. To do this, the frequencies of the chirp are tracked and the I/Q settings for DC values, as well as magnitude and phase, are changed as a function of time over the chirp. This can be labor intensive. Alternatively, the calibration may be performed only at a frequency in the center of the frequency band of the chirp. Although calibrating using only a center frequency may be less thorough, it still dramatically reduces the magnitude of the unwanted terms, including leakage components of the LO signals and USBs of the RF signals.

Figure 6A:
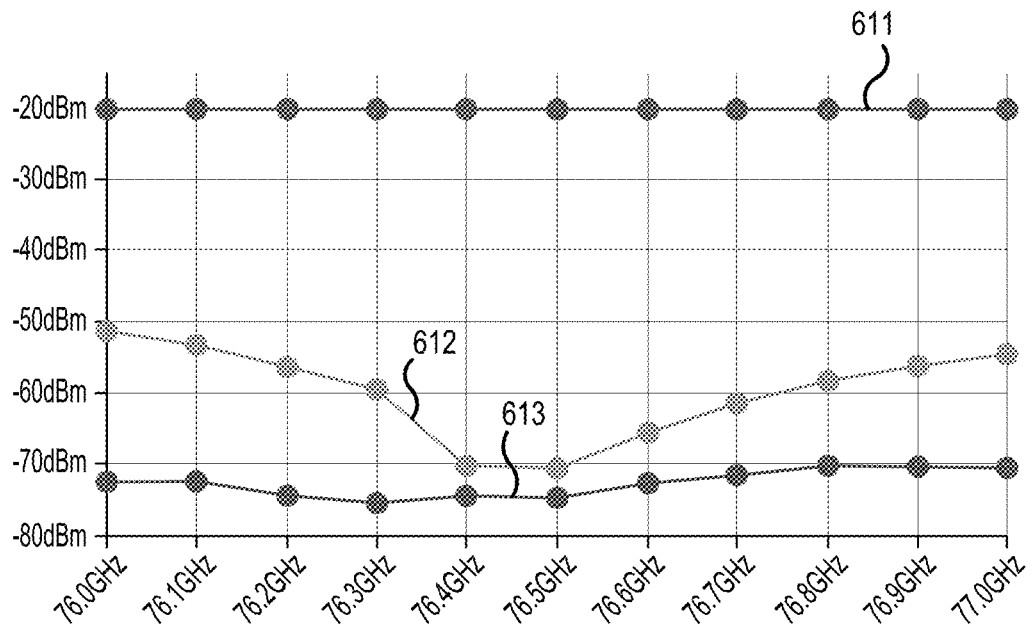
FIG. 6A is a graph showing affects on leakage components and USBs of calibrating frequency offset transceivers at one frequency, according to a representative embodiment.
Figure 6B:
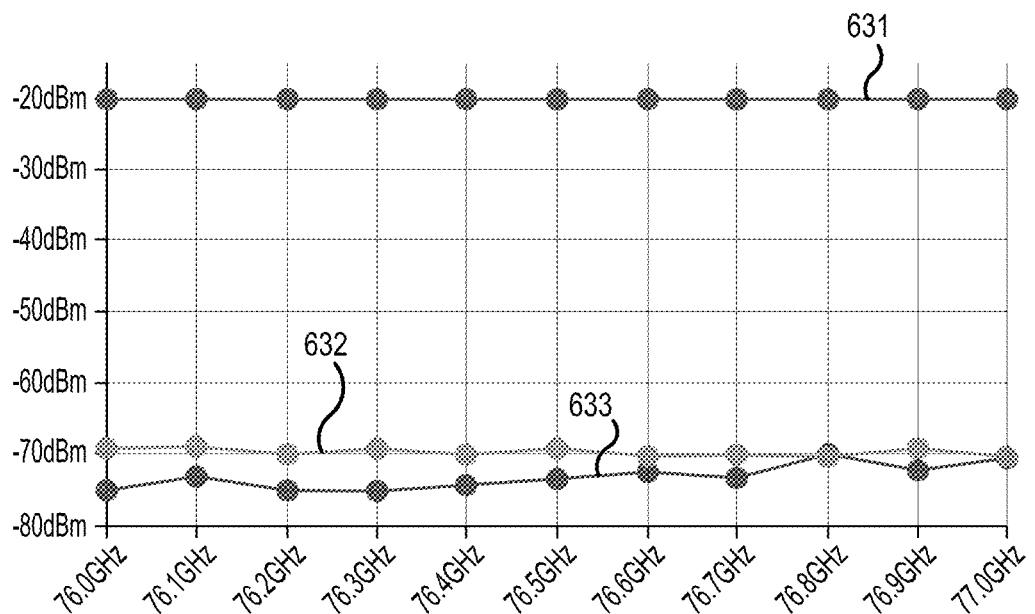
FIG. 6B is a graph showing affects on leakage components and USBs of calibrating frequency offset transceivers at multipole frequencies, according to a representative embodiment.

FIG. 6A is a graph showing affects on leakage components and USBs of calibrating frequency offset transceivers at one frequency, and FIG. 6B is a graph showing affects on leakage components and USBs of calibrating frequency offset transceivers at multipole frequencies, according to representative embodiments, for purposes of comparison.

In FIG. 6A, calibration has been performed using a calibration signal at a single frequency, 76.5 GHz, which is the center frequency of an illustrative FMCW radar signal that chirps between 76.0 GHz and 77.0 GHz. Trace 611 shows the DSB of the RF signal, trace 612 shows the leakage component of the LO signal, and trace 613 shows the USB of the RF signal resulting from the calibration. In FIG. 6B, calibration has been performed using calibration signals at multiple frequencies over the frequency band of the chirp, including 76.0 GHz, 76.1 GHz, 76.2 GHz, 76.3 GHz, 76.4 GHz, 76.5 GHz, 76.6 GHz, 76.7 GHz, 76.8 GHz, 76.9 GHz, and 77.0 GHz. Trace 631 shows the DSB of the RF signal, trace 632 shows the leakage component of the LO signal, and trace 633 shows the USB of the RF signal resulting from the calibration.

Comparison of traces 611 and 631 shows that the DSB of the RF signal is steady regardless of the calibration technique. Comparison of traces 612 and 632 shows that the leakage components rise about 20 dB (from about −70 dBm to about −50 dBm) the further from the center frequency used as the calibration point. This is typically an acceptable difference, since a radar signal is in the middle portion of the chirp frequency band most of the time, so there may be some DC reflection only during part of the chirp. Comparison of the traces 613 and 633 shows that the USB is nulled just as effectively with single frequency calibration.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for emulating an echo signal reflected from an emulated target in response to a radar signal transmitted by a radar under test, the system comprising:
 a probe antenna configured to receive the radar signal over-the-air from the radar under test, wherein a reflection component of the radar signal is reflected from at least the probe antenna;
 a receiver comprising an I/Q mixer configured to input the received radar signal as a local oscillator (LO) signal, to mix the LO signal with I and Q signals, and to output a radio frequency (RF) signal, wherein a leakage component of the LO signal leaks through the I/Q mixer;
 a signal generator configured to generate the I and Q signals mixed with the LO signal at the I/Q mixer; and
 a transmitter configured to transmit the RF signal as the emulated echo signal to the radar under test, the emulated echo signal indicating at least a range to the emulated target,
 wherein magnitude and phase of the leakage component of the LO signal are set to an equal magnitude and opposite phase of the reflection component of the radar signal, substantially canceling the reflection component of the radar signal received by the radar under test.

2. The system of claim 1, wherein the signal generator adjusts DC values of the I and Q signals mixed with the LO signal at the I/Q mixer to set the magnitude and phase of the leakage component of the LO signal to the equal magnitude and opposite phase of the reflection component of the radar signal substantially canceling the reflection component of the radar signal received by the radar under test.

3. The system of claim 1, further comprising:
 an RF splitter configured to split the radar signal received from the probe antenna to provide a split component of the radar signal, wherein a remainder of the radar signal is input to the I/Q mixer as the LO signal;
 a first attenuator configured to attenuate the split component of the radar signal to provide a first attenuated signal;
 a second attenuator configured to attenuate the RF signal to provide a second attenuated signal, wherein the first and second attenuated signals are attenuated at a frequency of the radar signal;
 an RF combiner configured to combine the first and second attenuated signals to provide a combined signal that incudes the RF signal and the leakage component of the LO signal; and a phase shifter configured to phase shift at least one of the first attenuated signal, the second attenuated signal, or the combined signal to provide the leakage component with the equal magnitude and the opposite phase of the reflection component of the radar signal, substantially canceling the reflection component of the radar signal received by the radar under test.

4. The system of claim 1, wherein the signal generator comprises a direct digital synthesizer (DDS).

5. The system of claim 1, wherein the signal generator comprises a field programmable gate array (FPGA) and a digital to analog converter (DAC).

6. The system of claim 1, wherein the RF signal comprises a desired sideband (DSB) that is a frequency shifted version of the LO signal and an undesired sideband (USB), and wherein the signal generator adjusts magnitude and phase of the I and Q signals to minimize the USB of the RF signal.

7. The system of claim 1, wherein the radar signal comprises a frequency-modulated continuous-wave (FMCW) radar signal.

8. The system of claim 1, wherein the I/Q mixer comprises a single-sideband mixer.

9. A method of emulating echo signals from an emulated target using test equipment, including an antenna and an I/Q mixer, in response to a radar signal transmitted by a radar under test, the method comprising:
receiving the radar signal from the radar under test, wherein a reflection component of the radar signal is reflected from at least the antenna;
mixing the received radar signal as a local oscillator (LO) signal with I and Q signals at the I/Q mixer to output a mixing product as a radio frequency (RF) signal, wherein a leakage component of the LO signal leaks through the I/Q mixer;
substantially canceling the reflection component of the radar signal using the leakage component of the LO signal; and
transmitting the RF signal as the emulated echo signal to the radar under test, wherein the emulated echo signal indicates at least a range to the emulated target.

10. The method of claim 9, wherein substantially canceling the reflection component of the radar signal comprises:
adjusting DC values of the I and Q signals input to the I/Q mixer to set magnitude and phase of the leakage component of the LO signal to an equal magnitude and opposite phase of the reflection component of the LO signal.

11. The method of claim 10, further comprising:
adjusting gain or attenuation of the RF signal to indicate radar cross section (RCS) of the emulated target.

12. The method of claim 9, wherein substantially canceling the reflection component of the radar signal comprises:
splitting the radar signal using an RF splitter, prior to the I/Q mixer, to provide a split component of the radar signal;
attenuating the split component of the radar signal;
attenuating the leakage component of the LO signal;
combining the attenuated split component of the radar signal and the attenuated leakage component of the LO signal using an RF combiner to provide a combined leakage component of the LO signal; and
phase sifting at least one of the attenuated split component of the radar signal, the attenuated leakage component of the LO signal, or the combined leakage component of the LO signal using a phase shifter such that the combined leakage component of the LO signal has an equal magnitude and opposite phase of the reflection component of the radar signal.

13. The method of claim 9, wherein the RF signal comprises a desired sideband (DSB) that is a frequency shifted version of the LO signal and an undesired sideband (USB), the method further comprising:
adjusting magnitude and phase of the I and Q signals input to the I/Q mixer to minimize the USB in the RF signal transmitted as the emulated echo signal to the radar under test.

14. The method of claim 9, wherein the reflection component of the radar signal further comprises reflections of electrical power resulting from impedance mismatches at the antenna.

15. The method of claim 9, wherein the radar signal comprises a frequency-modulated continuous-wave (FMCW) radar signal.

16. A method of calibrating a plurality of transceivers for emulating echo signals in response to a radar signal transmitted by a radar under test, wherein the plurality of transceivers includes a plurality of antennas and a plurality of I/Q mixers, respectively, the method comprising:
receiving a calibration signal at the plurality of antennas, wherein a portion of the calibration signal is reflected from at least each of the plurality of antennas as a reflection component of the calibration signal;
mixing the calibration signal as a local oscillator (LO) signal with I and Q signals input to each of the plurality of I/Q mixers to output mixing products as radio frequency (RF) signals, respectively, wherein a portion of the LO signal passes through each I/Q mixer of the plurality of I/Q mixers as a corresponding leakage component of the LO signal;
sequentially adjusting DC values of the I and Q signals input to the plurality of I/Q mixers to minimize the corresponding leakage components of the LO signals through the plurality of I/Q mixers, respectively; and
simultaneously adjusting DC values of the I and Q signals input to the plurality of I/Q mixers to create a cancellation signal from the corresponding leakage components of the LO signals, the cancellation signal having an equal magnitude and opposite phase of an aggregate reflection component of the calibration signal in order to substantially cancel the aggregate reflection component of the LO signal.

17. The method of claim 16, wherein the RF signals comprise different RF frequencies, different desired sidebands (DSBs), different undesired sidebands (USBs) and different harmonics, the method further comprising:
sequentially adjusting magnitudes and phases of the I and Q signals input to the plurality of I/Q mixers to minimize the USBs of the respective RF signals output by the plurality of I/Q mixers, respectively.

18. The method of claim 17, wherein sequentially adjusting the DC values of the I and Q signals input to the plurality of I/Q mixers further minimizes harmonics of the different harmonics that track with the corresponding leakage components of the LO signal.

19. The method of claim 17, wherein the calibration signal received at the plurality of antennas is flooded into a test chamber, containing at least the plurality of antennas, through a source probe antenna connected to a signal generator.

20. The method of claim 17, further comprising:
receiving the radar signal from the radar under test; and
emulating an echo signal in response to the radar signal using the calibrated plurality of transceivers.

\* \* \* \* \*